(12) United States Patent
Euget et al.

(10) Patent No.: US 6,684,243 B1
(45) Date of Patent: Jan. 27, 2004

(54) METHOD FOR ASSIGNING A DUAL IP ADDRESS TO A WORKSTATION ATTACHED ON AN IP DATA TRANSMISSION NETWORK

(75) Inventors: Guy Euget, Vence (FR); Jean-Francois Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/576,453

(22) Filed: May 23, 2000

(30) Foreign Application Priority Data

Nov. 25, 1999 (EP) .............................................. 99480124

(51) Int. Cl.$^7$ ............................................ G06F 15/177
(52) U.S. Cl. ...................... 709/222; 709/203; 709/220; 709/221; 709/217
(58) Field of Search ................................. 709/220, 221, 709/222, 203; 710/8, 9

(56) References Cited

U.S. PATENT DOCUMENTS

| | | | | |
|---|---|---|---|---|
| 6,286,038 B1 | * | 9/2001 | Reichmeyer et al. | 709/220 |
| 6,286,039 B1 | * | 9/2001 | Van Horne et al. | 709/221 |
| 6,449,642 B2 | * | 9/2002 | Bourke-Dunphy et al. | 709/222 |
| 6,466,981 B1 | * | 10/2002 | Levy | 709/227 |
| 6,587,882 B1 | * | 7/2003 | Inoue et al. | 709/227 |

OTHER PUBLICATIONS

Perkins, Charles, Mobile Networking in the Internet, 1999, ACM Press, Mobile Networking and Applications, vol. 3, issue 4.*

* cited by examiner

*Primary Examiner*—Glenton B. Burgess
*Assistant Examiner*—Kevin Parton
(74) *Attorney, Agent, or Firm*—Jerry W. Herndon (57) ABSTRACT

A method, system or program product for assigning a dual address to a workstation connecting anywhere to an IP data transmission network composed of at least a first Local Area Network (LAN) provided with a home Dynamic Host Configuration Protocol (DHCP) server, a home Domain Name Services (DNS) server and a home registration server; this method comprising:

- a) off-line registering into the registration server the workstation parameters including a static IP address, and a logon ID and password which have been provided to the user of the workstation,
- b) connecting the workstation to the IP network, the workstation being configured in DHCP mode, c) providing by the home registration server a dynamic IP address to the workstation,
- d) calling the home registration server by the workstation to get first the static IP address and, secondly a configuration file for the workstation, and
- e) configuring automatically the applications to be processed by the workstation with the static IP address or the dynamic IP address.

16 Claims, 5 Drawing Sheets

METHOD FOR ASSIGNING A DUAL IP ADDRESS TO A WORKSTATION ATTACHED ON AN IP DATA TRANSMISSION NETWORK

TECHNICAL FIELD

The present invention relates to the securing of communications between workstations in a data transmission network and in particular to a method for assigning a dual IP (Internet Protocol) address to a workstation attached on an IP data transmission network.

BACKGROUND

When a workstation (or host) is connected to an IP data transmission network, an IP address is assigned to it so that any other workstation may communicate with it through the network. Presently, an IP Version 4 address is a 32-bit binary value. Each byte of the address is converted into a decimal number and the numbers are separated by dots, such a dot notation being the popular way of expressing an IP address so that users can read and write it easily. It must be noted that the next generation of networks will use IP Version 6 using 128-bit addresses.

There are three IP address formats: class A for large networks for which the address starts with a number between 0 and 127, class B for medium sized networks for which the address starts with a number between 128 and 191 and class C for small networks for which the address starts with a number between 192 and 223. An organization which has a class A or class B network address is very likely to use a fairly complex network made up of several Local Area Networks (LAN) and Wide Area Networks (WAN). Accordingly, it makes sense to partition the address space in a way that matches the network as a family of sub-networks. To do this, the address is broken according to the following way:

<network address> <subnetwork address> <host address>

The workstation connecting to a network may have either a static address or a dynamic address. If a static address is chosen, this address is entered manually by the user at its workstation. But the user has the possibility of requesting a dynamic address automatically assigned by a Dynamic Host Configuration Protocol (DHCP) server. In such a case, the network administrator supervizes and distributes IP addresses from a central point and automatically sends a new IP address each time the workstation is plugged into a different location in the network. But an important drawback is that the DHCP server has no way to exchange and share addresses outside of the local network.

Another drawback is that DHCP server cannot share addresses with the Domain Name Server (DNS) which provides an application layer protocol that is part of the standard TCP/IP protocol suite and performs a naming service between hosts within the local administrative domain and across domain boundaries.

One of the benefits of a distributed network is the ability to add, remove or relocate system components such as servers and printers without disrupting the services provided by other components. Similarly, users of the network are regularly added, removed or relocated. These users must maintain appropriate access to the resources regardless of any changes in their location or status. Users should also have a seamless access to all the resources available, no matter where those resources are located in the network. In order to track and manage all the resources and users of a distributed network, most of today's network operating systems employ a registration server (often called "directory services") providing the capability to the user of accessing all servers and printers, to all the applications, messaging, database, communications and other services offered to them by the network, by utilizing a single network logon. But the reverse side of the present system of address assignment is that anyone can connect a workstation to the network in DHCP mode and get a dynamic IP address enabling him to access all the resources of the network without being allowed to do this.

At present, a user connecting with a workstation to a visited network in DHCP mode is not authenticated since the only way to do this is to check its MAC address and to reject him if this MAC address is not recognized. Now, such a MAC address is a physical address. It is therefore not possible with this address to know the home location of the user in order to give him authorization on the visited network. Therefore, the classical way of authentication is penalizing for the visited users. It would be useful to know which is the home IP address of a visiting user, but this address disappears on the network interface when a workstation is connecting the network in DHCP mode for assigning to it a dynamic IP address on the visited network.

SUMMARY OF THE INVENTION

Accordingly, the objet of the invention is to achieve a method of assigning to a workstation connected to an IP data transmission network, in addition to the dynamic address given by the DHCP server of the local network, a static address enabling the authentication of the workstation whatever accessible sub-network the workstation is connected to.

Another object of the invention is to achieve a method of assigning a dual address to any new workstation connecting an IP data transmission network, thus enabling securing any network which this workstation connects to by using the rights of the workstation associated with its home static address.

The invention relates therefore to a method for assigning a dual address to a workstation connecting anywhere to an IP data transmission network composed of at least a first Local Area Network (LAN) provided with a home Dynamic Host Configuration Protocol (DHCP) server, a home Domain Name Services (DNS) server and a home registration server. This method comprises the steps of:

a) off-line registering into the home registration server previously to connecting the workstation to the network, the workstation parameters including a static IP address, the name, the rights of the workstation, the station MAC address and a logon ID and password which have been provided to the user of the workstation, b) connecting the workstation to the IP network, the workstation being configured in DHCP mode, c) providing by the home registration server a dynamic IP address to the workstation, d) calling the home registration server by the workstation using the logon ID and the password to get first the static IP address and, secondly a configuration file for the workstation, e) configuring automatically the applications and protocols to be processed by the workstation with the static IP address or the dynamic IP address, such a configuration being based upon the configuration file.

According to another aspect of the invention, the IP data transmission network includes a second LAN to which the workstation is now connected, the second LAN including a visited DHCP server, a visited DNS server, and a visited registration server; and the method further comprises the steps of:

f) providing by the visited registration server a new dynamic IP address to the workstation, g) calling the visited registration server by the workstation using a guest logon to provide the visited registration server with the IP static address of the workstation, h) contacting the home registration server by the visited registration server in order to get the characteristics of the workstation for updating the visited registration server.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF A PREFERRED EMBODIMENT OF THE INVENTION

Figure 1:
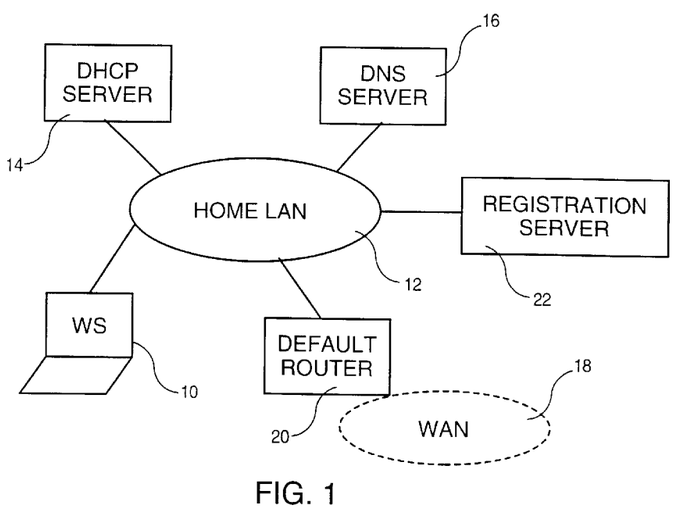
FIG. 1 represents a block-diagram of a network with a home LAN to which is connected a workstation using the method according to the invention.

FIG. 1 describes the topology of a local home network. A workstation 10 is attached to a home LAN 12. The dynamic IP address is provided to the attached workstation by a DHCP server 14. The name of this workstation is linked to this dynamic IP address on the DNS server 16. Access to the external world, for instance a WAN 18, is made through a default router 20 and a registration server 22 is available to identify and help to fully configure the attached workstation. The various servers may not be attached directly on the workstation subnet but act as local servers for this workstation which means that the subnet of this workstation is managed by these servers with regard to the function they provide.

Figure 2:
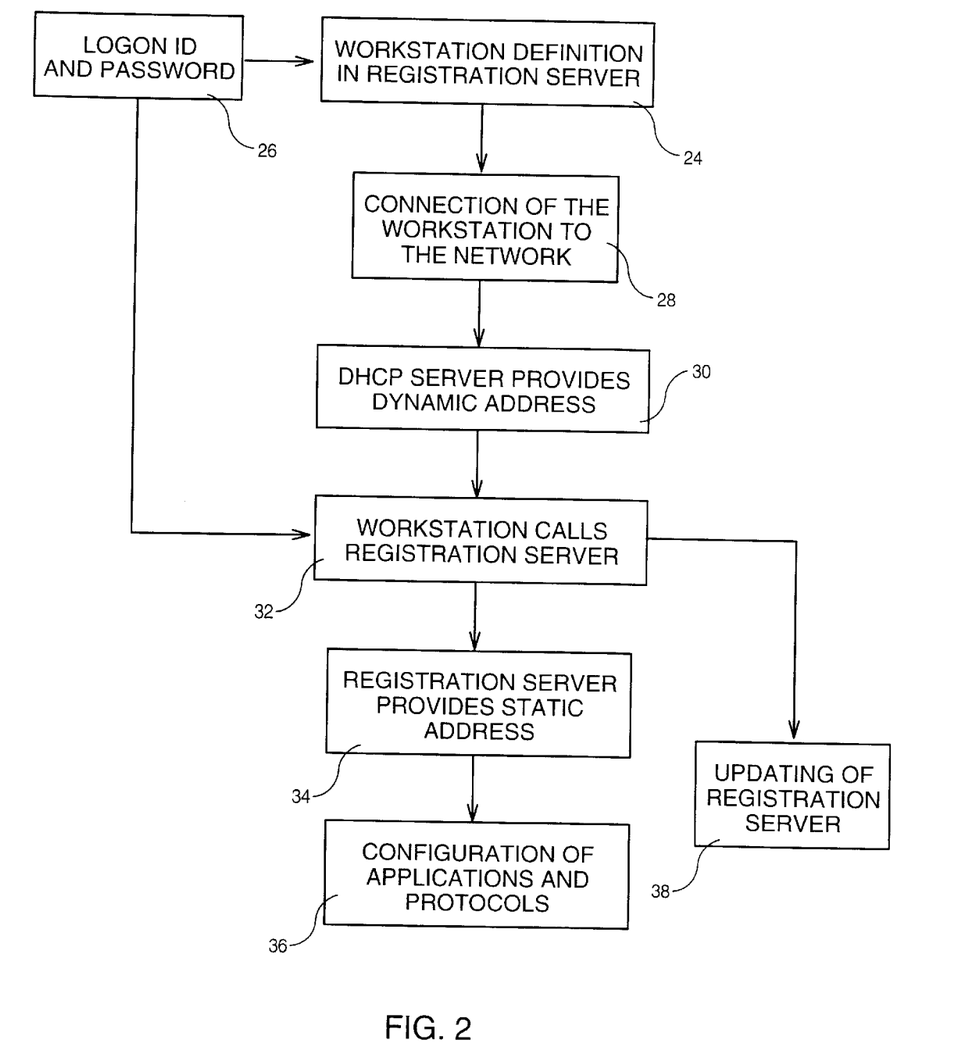
FIG. 2 is a flow chart representing the steps of the registration procedure used in case of a workstation connected to a network according to FIG. 1.

FIG. 2 illustrates a flow chart representing the different steps of the method according to the invention in the environment of FIG. 1. At the beginning there is nothing pre-configured inside the workstation. An off-line registration (step 24) is performed with some parameters for this workstation providing the static IP address, the name, the rights for this station including certificates plus a logon id and password also provided to the user (step 26). All this information is stored in the registration server. This server waits for the presence of the workstation to perform the initialization. Some templates may be predefined a for guest user having some limitation on the rights allowed the guest user.

Then, workstation 10 is attached on the LAN (step 28) with its LAN adapter configured for DHCP, and DHCP server 14 provides it with a dynamic IP address associated with its MAC address (step 30).

At this time, workstation 10 may work with limited access depending on the filtering rules applied on the default router and local servers. A firewall may also be installed either within the router or outside of the router. Filtering and security rules described in this description may apply either to a router, a firewall or both.

If the user has a logon and password (step 26) to access the registration server 22, the user may then call (step 32) the registration server to get first (step 34) a static address which will be used simultaneously with its already stored dynamic address and second a configuration file for its station or at least a template including the specific configuration for this location and the rights of the user (step 36). It may also download certificates. In addition, an IP mask is provided with this IP address to identify the different fields within the IP address and more precisely the boundary between the subnet and host fields. The server will also verify the MAC address of the user workstation as a crosschecking on top of the logon/password checking. Then, the internal files of registration server 22 are updated as the workstation is now registered (step 38).

There is a preferred method in the present invention to access the registration server. The IP address of the registration server is built using the network and subnet fields of the workstation IP dynamic address and a fixed value for the host field which allows for contacting the latter server without the need to know its real address. Either the default router will redirect this message to the appropriate address or a user proxy as described later, implemented on each subnet will do that function.

This assumes that the user has moved within the home network and that its workstation is reconnected to another place but always inside his home network. If this installation occurs later after the last connection on this network, the dynamic IP address may have been given to another station. In such a case, the DHCP server will provide the requesting workstation with another dynamic IP address. Locally, the workstation will have its configuration updated. An automatic call to the home registration server may be added on the workstation connection application in order to update it with the new dynamic IP address value.

Figure 3:
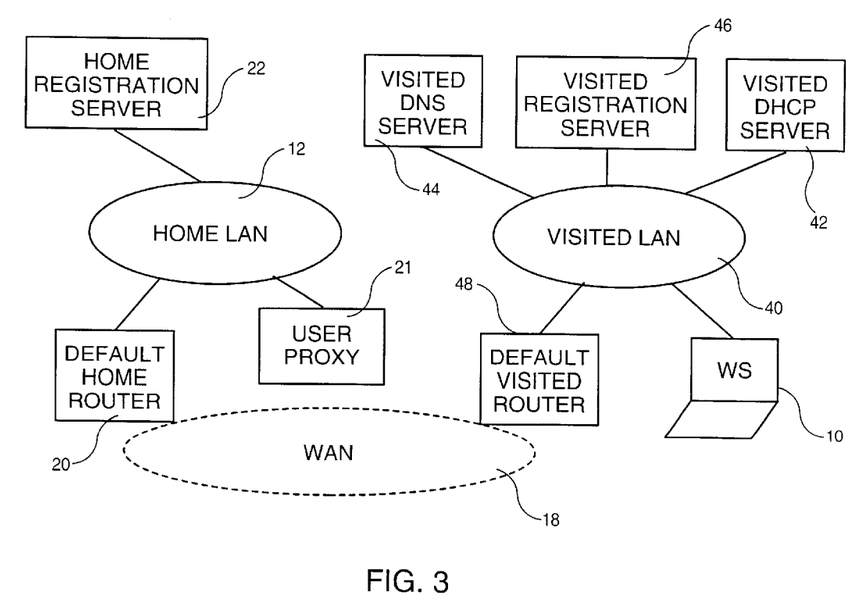
FIG. 3 represents a block-diagram of a network with a home LAN and a visited LAN to which is connected a workstation using the aspect of the method according to the invention.

It is assumed now that the workstation 10 which has been configured in home network 12 is attached to a visited LAN 40 as illustrated in FIG. 3. As for the home network, visited network 40 is provided with a visited DHCP server 42, a visited DNS server 44 and a visited registration server 46. The various servers may not be attached directly on the subnet 40 but act as local servers for this workstation which means that the subnet of workstation 10 is managed by these servers regarding the function they provide. There should be a network connection between visited LAN 40 and home LAN 12 through WAN 18 connected to home LAN 12 by default home router 20 and to visited LAN 40 by default visited router 48, in order to provide workstation 10 attached to the visited LAN with rights corresponding to what is defined in the home registration server. When this cannot be achieved, an alternate method can be used which uses the certificate provided by the home registration server to assign rights. The visited registration server will validate the certificate thanks to a connection to the Certificate Authority (CA) and will update the rights for this station.

Figure 4:
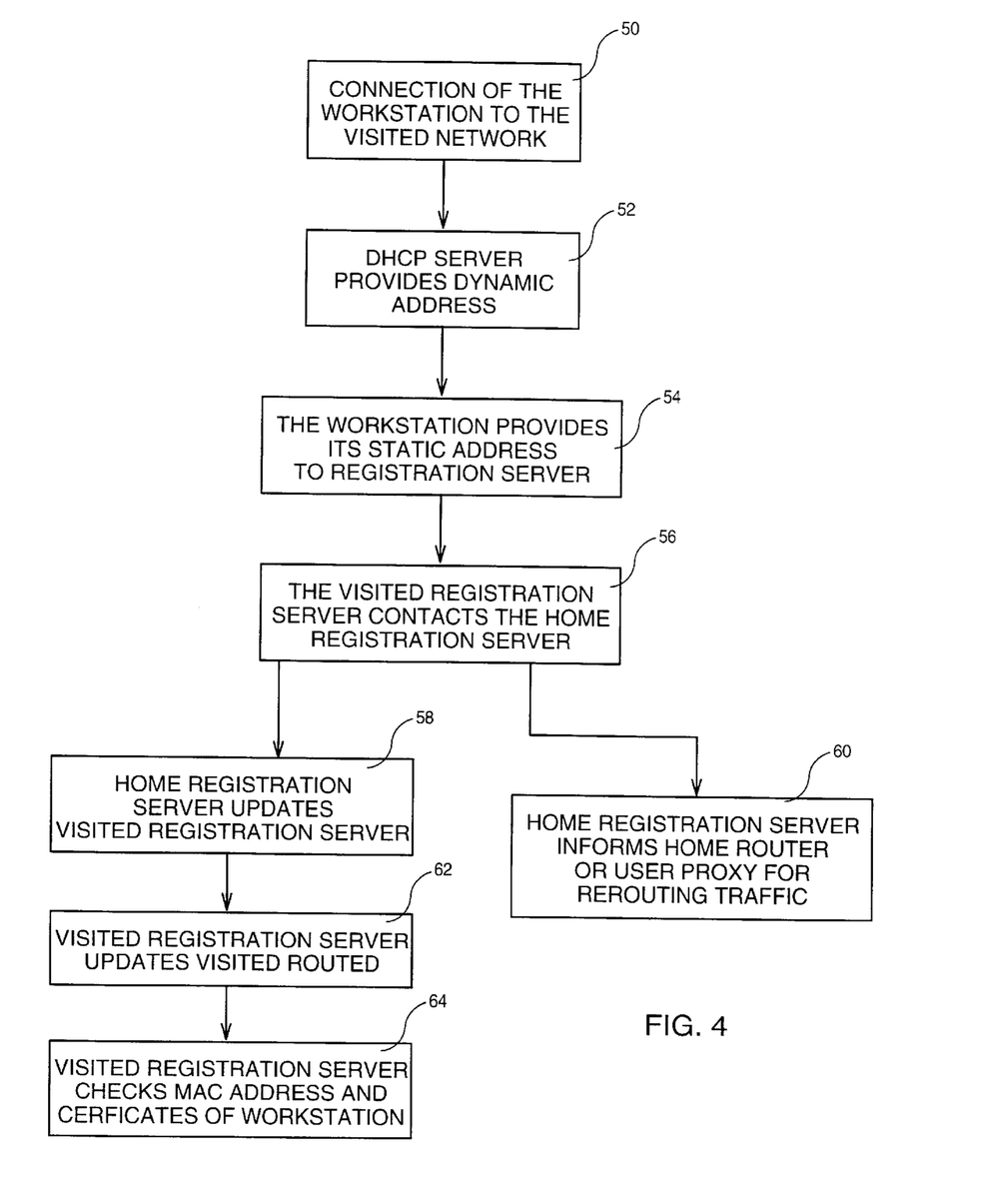
FIG. 4 is a flow chart representing the steps of the registration procedure used in case of a workstation connected to a network according to FIG. 3.

The visited registration procedure on visited LAN 40 is illustrated by the flow chart in FIG. 4. The workstation is first attached to LAN 40 with its LAN adapter configured in DHCP mode (step 50). Visited DHCP server 42 provides the workstation with a dynamic address (step 52). At this time the workstation may work with limited access depending on the filtering rules applied on the default router and local servers. A firewall server may also be installed either within the router or outside of the router. Such a firewall server is a sub-system of computer software and hardware that intercepts data packets before allowing them into or out of the LAN. It makes decisions on whether or not to allow data to pass based upon a security policy. For each packet of data, the firewall compares known components of the packet to a security rule set and decides if the packet should be allowed to pass.

In addition, a firewall may have security rules that involve altering the packet in some basic ways before passing the data. With a sensible security policy and a security rule set designed to implement that policy, a firewall can completely protect a LAN from attacks.

Filtering and security rules described in this description may apply either to a router, a firewall or both. Then the user contacts visited registration server 46 by means of a guest logon and the dynamic address of the workstation, in order to provide the visited registration server with its static address (step 54). An additional parameter which is a mask of the static address indicating the subnet/host boundary is also provided. Note that, as already mentioned, the IP address of visited registration server 46 is composed of the network and subnet fields of the dynamic address assigned to the workstation and a predetermined value (the same as for the home registration server) for the host field, which allows to contact the registration server without knowing its real address.

The IP static address allows the visited registration server to contact the home registration server (step 56) since this address contains the network and subnet value of the latter server. The host field of the home registration server being a fixed value as mentioned above, the full IP address is easily reconstructed. The home registration server communicates the characteristics of the workstation to the visited registration server for updating (step 58) in answer to the request. Note that a secure protocol may be used between the two registration servers which can use certificates from a central authority for authentication.

Then the home registration server, informs the home router 20 or a user proxy 21 to reroute all incoming traffic having this workstation as destination address (either static or dynamic) to the new defined dynamic address provided by the visited DHCP server. Rerouting may use either address translation or encapsulation/tunneling (step 60). The user proxy is a newly defined network element which is part of this invention and which acts as a virtual workstation when the workstation is no longer in the home LAN but recognized as existing somewhere in the network. In that case the user proxy device will act with the home LAN as being the workstation, intercepting all traffic having the IP address of the remotely logged workstation. In fact, a user proxy may intercept the traffic for several workstations. This user proxy is updated by the home registration server about the current active address of the workstation, and is able to forward all the traffic to the workstation using address translation. In addition to normal leased connection, this user proxy may activate switched connection to a workstation not permanently logged on the network. This may be useful for mobile users that can be joined without being connected.

On another hand, the visited registration server updates the visited router and/or firewall server with the rights for the visiting workstation (step 62). In addition, it checks the MAC address and certificates and/or the password corresponding to this user (step 64).

Figure 5:
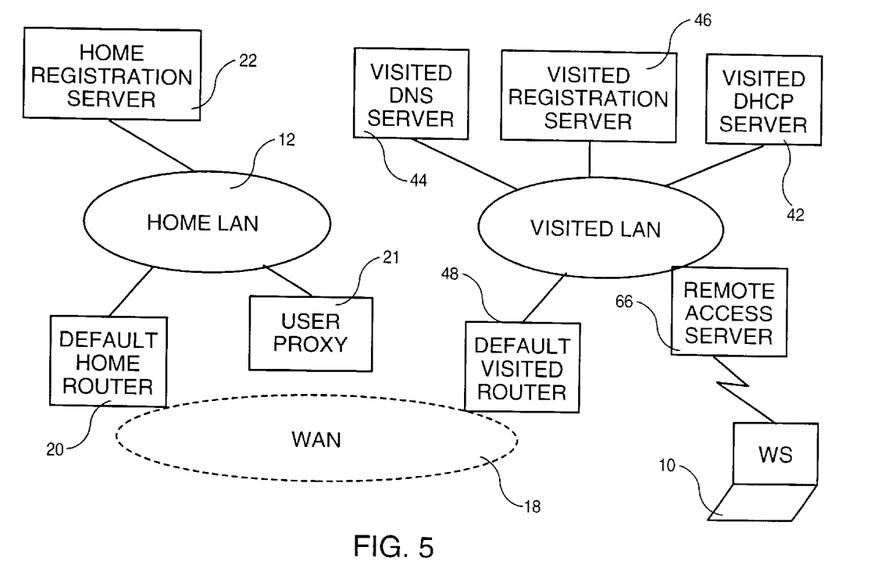
FIG. 5 represents a block-diagram of a network with a home LAN and a visited LAN to which is connected a workstation by the intermediary of a remote access server using an aspect of the method according to the invention.

In reference to FIG. 5, it is assumed now that workstation 10 is attached via a dial access by means of remote access server 66 to visited LAN 40. Remote access server 66 controls the user authorization before connecting to the network. Once the connection is established, the visited DHCP server provides, as previously, the dynamic IP address to the workstation. The workstation 10, via the remote access server will be able to access home LAN 12 in order to get its rights corresponding to what is defined in the home registration server 22. When this cannot be achieved an alternate method is to use the certificate provided by the home registration server to assign rights. The remote access server will validate the certificate thanks to a connection to the Certificate Authority (CA) and will update the rights for this station.

It must be noted that, except the connection of the workstation to the network which is performed by a remote dial access from workstation 10 to remote access server 66 using a dial logon information which includes the static address of the workstation, all the steps of the registration procedure are the same ones as illustrated in FIG. 4, and will not be described again.

Figure 6:
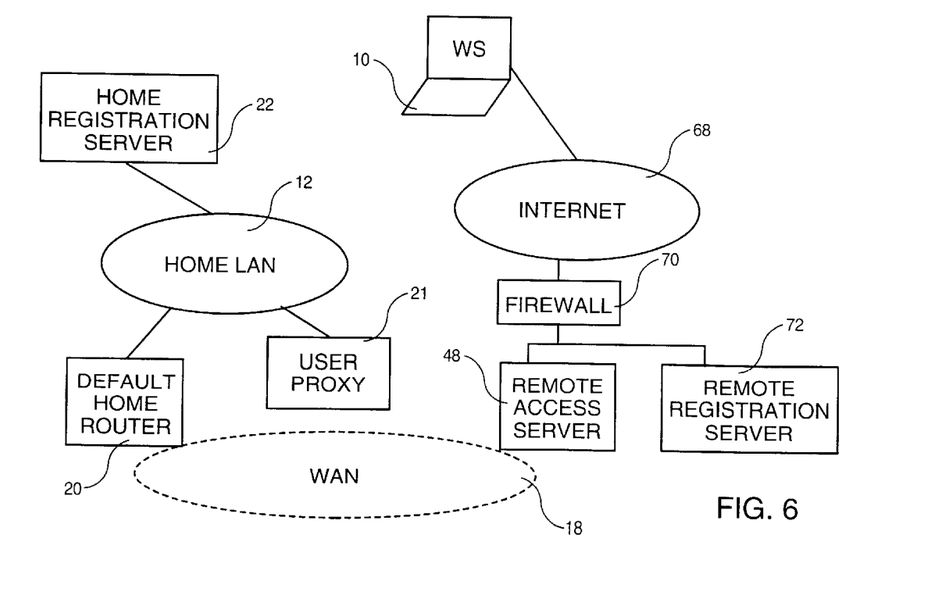
FIG. 6 represents a block-diagram of a network with a home LAN and the Internet network to which is connected a workstation by the intermediary of a firewall server using an aspect of the method according to the invention.

Another case is when workstation 10 is attached to the Internet network 68 as illustrated in FIG. 6. In such a case, a firewall server 70 controls the user authorization access via the certificate before connecting the workstation to home LAN 12. Thus, all the communications are performed under a secure tunnel path and the address and rights will be managed by a registration server 72 which can be directly accessed from firewall 70 as previously made by means of the remote access server. Therefore, all the steps of the registration procedure are performed under the control of firewall server 70 replacing either the workstation when this one is directly connected to a LAN (see FIG. 3) or the remote access server in case the workstation is connected to the network by the intermediary of a remote access server (see FIG. 5), except that there is no dynamic IP address assigned to the workstation since the connection to the Internet network requires that workstation already has such an address assigned by the Internet network administrator.

Figure 7:
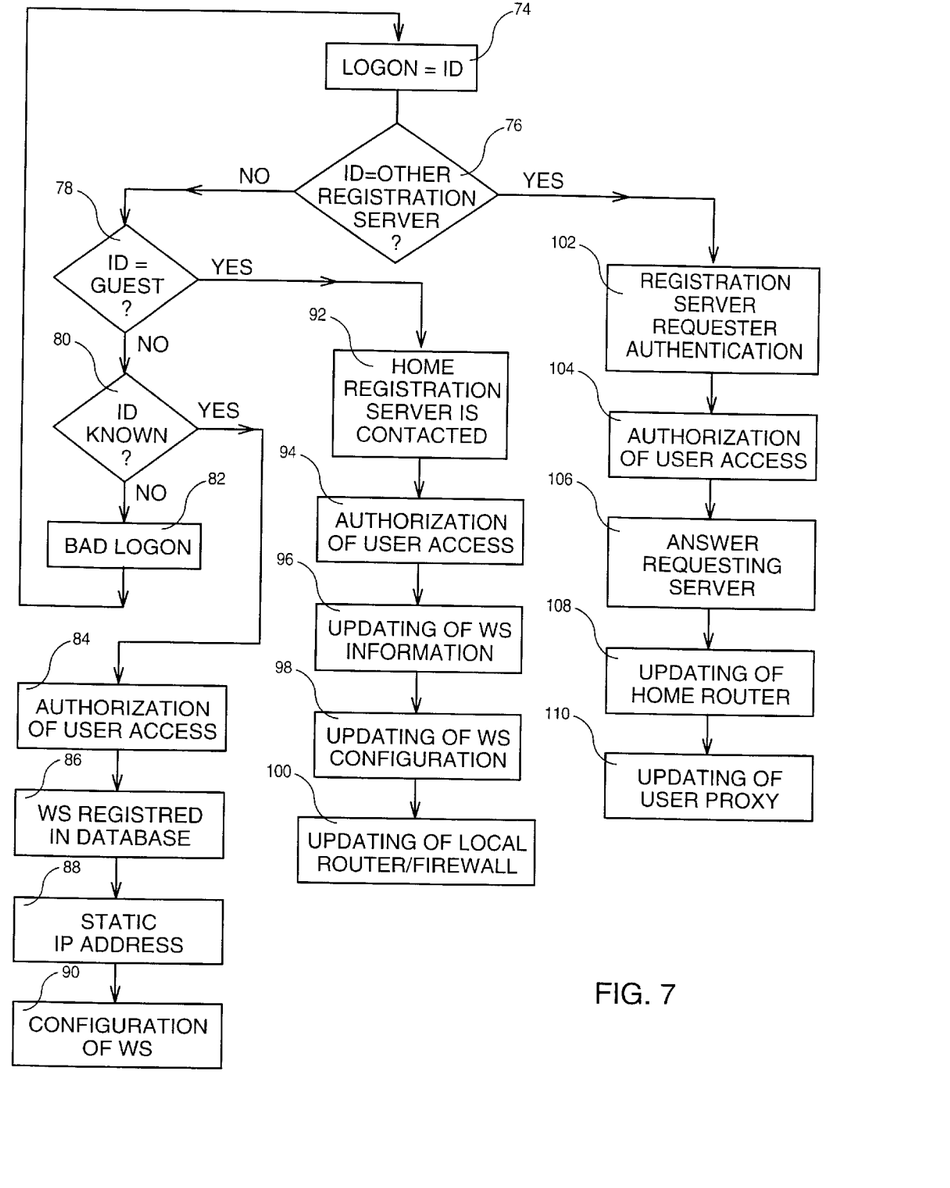
FIG. 7 is a flow chart representing the steps followed by the method according to the invention when a workstation logs on a network.

The operations performed by the directory services of any registration server are illustrated by the flow chart of FIG. 7. First, a logon defining an identification ID is detected (step 74). It is checked whether such ID corresponds to another registration server (step 76). If not, a check is made to determine whether ID corresponds to a guest (step 78). If not, it is determined whether ID is known (step 80). If not, that means that the entered logon was a bad logon (step 82) and the process is looped back to step 74. If the ID is known, the server checks the authorization of user access (step 84), registers the workstation in its database (step 86), sends the static IP address to the user (step 88) and then configures the workstation with a configuration file (step 90).

When the ID corresponds to a guest, the server contacts the home registration server (step 92), checks the authorization of user access (step 94), updates the workstation information in its database (step 96), updates the workstation configuration (step 98) and updates the local router or the firewall server depending on how the workstation is connected to the network (step 100).

When the registration server identified by the logon is another registration server, there is first an authentication of the registration server which is requesting (step 102). Then, the authorization of the user access is checked (step 104), an answer is provided to the registration server (step 106), the home router is updated (step 108) and the user proxy is updated (step 110).

What is claimed is:

1. A method for assigning a dual address to a workstation connecting to an IP data transmission network composed of at least a first Local Area Network (LAN)provided with a home Dynamic Host Configuration Protocol (DHCP) server, a home Domain Name Services (DNS)server and a home registration server, said workstation having parameters, said method comprising the steps of:
   a) off-line registering into said registration server prior to connecting said workstation to said network, said workstation parameters including a static IP address, a name, rights of the workstation, and a logon ID and password which have been provided to a user of the workstation;
   b) connecting said workstation to said IP network, said workstation being configured in DHCP mode;
   c) providing, by said home registration server, a dynamic IP address to said workstation;
   d) calling said home registration server, by said workstation, using said logon ID and said password to get first said static IP address and, secondly a configuration file for said workstation; and
   e) configuring automatically any applications and protocols to be processed by said workstation with said static IP address or said dynamic IP address, such a configuration being based upon said configuration file.

2. A method according to claim 1, wherein said IP data transmission network includes a second LAN to which is connected said workstation, said second LAN including a visited DHCP server, a visited DNS server and a visited registration server; said method further comprising the steps of:
   f) providing, by said visited registration server, a new dynamic IP address to said workstation;
   g) calling said visited registration server by said workstation using a guest logon to provide said visited registration server with the static IP address of said workstation; and
   h) contacting said home registration server, by said visited registration server, in order to get characteristics of said workstation for updating said visited registration server.

3. A method according to claim 2, wherein said workstation is connected to said second LAN by an intermediary of a remote access server, said remote access server controlling authorization of the workstation to be connected to said second LAN, and wherein said remote access server performs the operations performed by said workstation when it is directly connected to said second LAN.

4. A method according to claim 2, wherein said workstation is connected to an Internet network, said Internet network being attached to said network by a firewall server which controls access authorization of said workstation to be connected to said network and wherein said firewall server performs operations performed by said workstation when it is directly connected to said network except the step of providing a dynamic IP address which is provided by an Internet administration.

5. A method according to claim 2, 3 or 4, wherein a user proxy is attached to said first LAN for acting as a virtual workstation instead of said workstation, said user proxy intercepting all the traffic transmitted to an IP address of said workstation and being updated by said home registration server with the current active address of said workstation.

6. A method according to claim 1, 2, 3 or 4 wherein the IP address of a registration server is composed of network and subnet fields of a dynamic IP address provided to said workstation connecting anywhere in said network and a fixed value as a host field, thereby allowing contact of said registration server without knowing said registration server's real address.

7. A method according to claim 1, 2, 3 or 4 wherein, further to said static address provided by said home registration server to said workstation, a mask identifying different fields within said static address and more precisely a boundary between subnet and host fields is provided by said home registration server.

8. A program product residing on programmably readable media for assigning a dual address to a workstation connecting to an IP data transmission network composed of at least a first Local Area Network (LAN)provided with a home Dynamic Host Configuration Protocol (DHCP) server, a home Domain Name Services (DNS)server and a home registration server, said workstation having parameters, said computer program product comprising the programmable steps of:
   a)programmably registering off-line into said registration server prior to connecting said workstation to said network, said workstation parameters including a static IP address, a name, rights of the workstation, and a logon ID and password which have been provided to a user of the workstation;
   b) programmably connecting said workstation to said IP network, said workstation being configured in DHCP mode;
   c) programmably providing, by said home registration server, a dynamic IP address to said workstation;
   d) programmably calling said home registration server, by said workstation, using said logon ID and said password to get first said static IP address and, secondly a configuration file for said workstation; and
   e) programmably configuring automatically any applications and protocols to be processed by said workstation with said static IP address or said dynamic IP address, such a configuration being based upon said configuration file.

9. A computer program product according to claim 8, wherein said IP data transmission network includes a second LAN to which is connected said workstation, said second LAN including a visited DHCP server, a visited DNS server and a visited registration server; said computer program product further comprising the steps of:
   f) programmably providing, by said visited registration server, a new dynamic IP address to said workstation;
   g) programmably calling said visited registration server by said workstation using a guest logon to provide said visited registration server with the static IP address of said workstation; and h) programmably contacting said home registration server, by said visited registration server, in order to get characteristics of said workstation for updating said visited registration server.

10. A computer program product according to claim 9, wherein said workstation is connected to said second LAN by an intermediary of a remote access server, said remote access server controlling authorization of the workstation to be connected to said second LAN, and wherein said remote access server performs the operations performed by said workstation when it is directly connected to said second LAN.

11. A computer program product according to claim 9, wherein said workstation is connected to an Internet network, said Internet network being attached to said network by a firewall server which controls access authorization of said workstation to be connected to said network and wherein said firewall server performs operations performed by said workstation when it is directly connected to said network except the step of providing a dynamic IP address which is provided by an Internet administration.

12. A computer program product according to claim 9, 10 or 11, wherein a user proxy is attached to said first LAN for acting as a virtual workstation instead of said workstation, said user proxy intercepting all the traffic transmitted to an IP address of said workstation and being updated by said home registration server with the current active address of said workstation.

13. A computer program product according to claim 8, 9, 10 or 11 wherein the IP address of a registration server is composed of network and subnet fields of a dynamic IP address provided to said workstation connecting anywhere in said network and a fixed value as a host field, thereby allowing contact of said registration server without knowing said registration server's real address.

14. A computer program product according to claim 8, 9, 10 or 11 wherein, further to said static address provided by said home registration server to said workstation, a mask identifying different fields within said static address and more precisely a boundary between subnet and host fields is provided by said home registration server.

15. A data transmission system for assigning a dual address to a workstation connecting to an IP data transmission network, said system comprising:

a first Local Area Network (LAN);

a home Dynamic Host Configuration Protocol (DHCP) server;

a home Domain Name Services (DNS) server; and a home registration server, wherein said workstation has parameters, wherein said system:

a) registers off-line into said registration server prior to connecting said workstation to said network, said workstation parameters including a static IP address, a name, rights of the workstation, and a logon ID and password which have been provided to a user of the workstation;

b) connects said workstation to said IP network, said workstation being configured in DHCP mode;

c) said home registration server provides a dynamic IP address to said workstation;

d) said workstation calls said home registration server using said logon ID and said password to get first said static IP address and, secondly a configuration file for said workstation; and e) said workstation configures, automatically, any applications and protocols to be processed by said workstation with said static IP address or said dynamic IP address, such a configuration being based upon said configuration file.

16. A system according to claim 15, wherein said IP data transmission network includes a second LAN to which is connected said workstation, said second LAN including a visited DHCP server, a visited DNS server and a visited registration server and further comprising:

f) said visited registration server a new dynamic IP address to said workstation;

g) said workstation calling said visited registration server using a guest logon to provide said visited registration server with the static IP address of said workstation; and h) said visiting registration server contacting said home registration server in order to get characteristics of said workstation for updating said visited registration server.

* * * * *

UNITED STATES PATENT AND TRADEMARK OFFICE
CERTIFICATE OF CORRECTION

| | | |
|---|---|---|
| PATENT NO. | : 6,684,243 B1 | |
| APPLICATION NO. | : 09/576453 | |
| DATED | : January 27, 2004 | |
| INVENTOR(S) | : Guy Euget and Jean-Francois Le Pennec | |

It is certified that error appears in the above-identified patent and that said Letters Patent is hereby corrected as shown below:

On the Title Page, item: (57) please replace Abstract with the following Abstract:

Assigning a dual address to a workstation in an IP data network composed of at least a first Local Area Network (LAN) provided with a home Dynamic Host Configuration Protocol (DHCP) server, a home Domain Name Services (DNS) server and a home registration server. Workstation parameters, including a static IP address, and a longon ID and password, which have been provided to the user of the workstation are registered into the registration server in an offline mode. The workstation is connected to the IP network in a DHCP mode. A dynamic IP address is provided to the workstation by the registration server. The home registration server is then called by the workstation to get first the static IP address and, secondly a configuration file for the workstation. The applications to be processed by the workstation are then configured automatically with the static IP address or the dynamic IP address.

Signed and Sealed this

Nineteenth Day of June, 2007

JON W. DUDAS
*Director of the United States Patent and Trademark Office*